Patented June 13, 1939

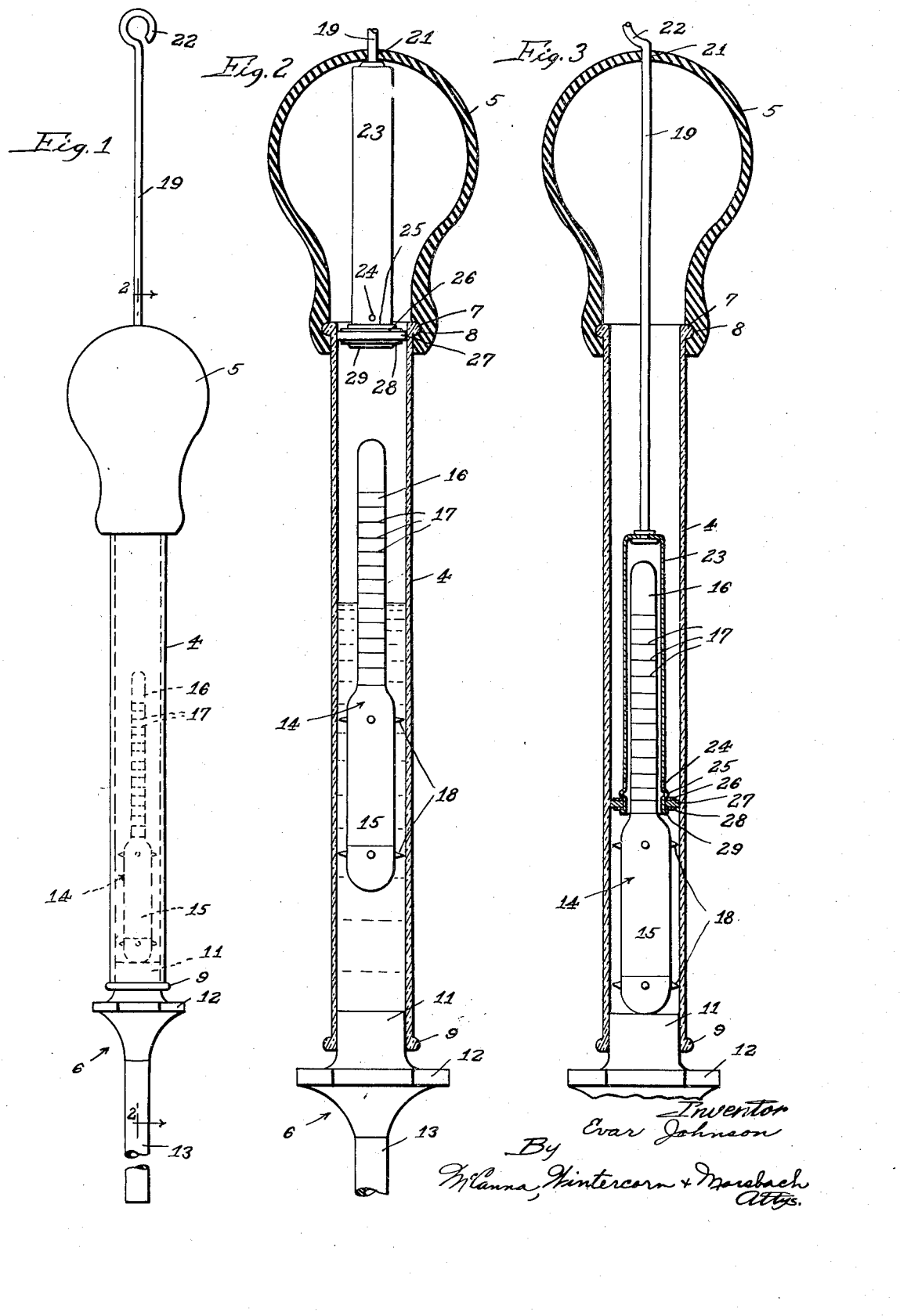

2,162,020

UNITED STATES PATENT OFFICE 2,162,020

HYDROMETER

Evar Johnson, Rockford, Ill., assignor to Edward A. Morsbach, Rockford, Ill.

Application January 12, 1938, Serial No. 184,507

5 Claims. (Cl. 265—45)

This invention has special reference to hydrometers of the type used for testing the antifreeze solution of automobile radiators, the electrolyte of storage batteries, and for like testing purposes.

Considerable difficulty and inconvenience is occasioned with hydrometers of this type due to clouding of the walls of the glass tube, which obscures the scale on the hydrometer float contained therein making it difficult and sometimes impossible to read the same. This clouding may be due to a number of causes, the most common being the accumulation of dirt or sediment on the walls and the precipitation of moisture thereon, the latter forming an opalescent film which obscures the scale.

An object of the invention is the provision of a hydrometer having means for clearing and wiping the tube immediately before or during use of the device to render the scale visible for reading.

Another object is the provision of a wiping device which may be installed in conventional hydrometers of the class described.

Other objects and advantages will become apparent from the following description and the accompanying drawing, in which Figure 1 is a side view of a hydrometer embodying my invention showing the wiper in the withdrawn position;

Fig. 2 is a section on the line 2—2 of Figure 1, and

Fig. 3 is a section similar to Fig. 2 showing the wiper in the inserted position.

In the embodiment of the invention herein shown I have employed the usual hydrometer including a glass tube designated generally by the numeral 4, a rubber bulb 5, and a rubber tip 6. These are of the type conventionally used in hydrometers for batteries and radiator solutions. The glass tube 4 has an annular bead 7 at its upper end, and the bulb 5 has a recess 8 in the neck thereof adapted to receive the bead 7 so as to make substantially an air-tight fit whereby when the bulb is compressed and released, fluid will be drawn into the glass tube 4 through the rubber tip 6. The lower end of the glass tube 4 also has a bead 9 primarily for the purpose of protecting the end of the tube from breakage. The rubber tip 6 commonly has a sleeve 11 receivable within the lower end of the glass tube 4, a flange 12 and a tube 13, all of the elements being molded integrally, the rubber tube 13 being adapted for insertion into the battery, the radiator, or other liquid container upon which test is to be made.

Held within the container is a hydrometer float 14 having the usual bulb portion 15 and stem portion 16, the stem having suitable graduations thereon as shown at 17. The bulb portion 15 has the usual knob-like projections 18 spaced thereon to prevent the wall of the bulb from adhering against the inner wall of the glass tube 4 and to keep the float free within the tube. When the tube 4 is free of liquid, the float seats with its bottom end against the rubber sleeve 11 as shown in Fig. 3, and when partially filled with liquid of a density within the range of the hydrometer floats in the liquid in the fashion shown in Fig. 2.

The elements heretofore described are intended to be those of the conventional hydrometer and to include a tube for holding the hydrometer float and the fluid to be tested, a flexible means for insertion into the liquid to be drawn into the tube, and a bulb for drawing the liquid into the tube, and it will be recognized that these elements may take a wide variety of shapes. In the use of devices of this kind, as for example, on radiator solutions, the inner walls of the tube very soon become dirty because of the rusty nature of the solution. Each time a test solution is drawn into the glass tube a certain amount of this fine sediment stays on the walls of the tube until after a comparatively small number of tests it is impossible to see the scale on the stem 16. In addition to this difficulty, the hydrometer is used under conditions which further aggravate the situation. In other words, the test solution is ordinarily warm or hot, whereas the outside atmosphere is cold so that on a cold day as soon as the test solution is drawn into the tube the water vapor in the space above the level of the liquid in the tube precipitates in small droplets on the inner surface of the tube producing a foggy condition which renders it difficult or impossible to read the graduations on the scale. Analogous conditions arise in the use of hydrometers in other fields, and I have provided means for obviating these difficulties.

A rod or stiff wire 19 passes through the end of the bulb 5 as shown at 21, the opening in the bulb being smaller than the rod to produce a tight fit and provide a seal. The end of the rod is given suitable shape characteristics as shown at 22 to facilitate its handling. The lower end of the rod is attached to a metal tube or sleeve designated generally by the numeral 23, the internal diameter of which is greater than the external diameter of the stem 16, and the length of which is greater than the length of the stem so that the sleeve may pass downward over he stem in the manner shown in Fig. 3. The tube has a plurality of openings 24 spaced annularly thereof to permit the passage of air or liquid. The tube is provided with an annular flange 25 adjacent the lower end thereof against which bears a washer 26. A circular squeegee member 27 of such diameter as to rest firmly against the inner walls of the tube 4 is positioned against the washer 26 and held thereagainst by means of a washer 28, the washer 28 being held in place by the end portion 29 of the tube which is spun over to hold the washers and squeegee element firmly together. It will be noted from Fig. 3 that the combined length of the rod 19 and the sleeve 23 is such that when the hydrometer float rests against the sleeve 11 and the rod is forced downward until the ring 22 abuts against the bulb 5, the lower end of the tube 23 will approach the bulb 15 but will not come into contact therewith, whereby upon reciprocation of the rod the squeegee element 27 may be brought from the upper end of the glass tube 4 to a point below the lower end of the scale 17 but cannot be brought sufficiently low to break the hydrometer float by pressure against the bulb 15. Where the hydrometer tester is intended for use on radiator solutions the rod 19, the sleeve 23 and the washers 26 and 28 may be formed of ordinary steel or other metal but when intended for use with battery solutions these parts must, of course, be formed of materials not easily attacked by sulphuric acid, in which case they may be made of suitable metal alloys, hard rubber, synthetic resins such as Bakelite, or other materials, as is well known in the art.

Attention is directed to the fact that I have provided means for wiping the interior surface of the tester tube without in any way dismantling the hydrometer and to perform this wiping operation at the moment of use so that not only can the accumulated dirt be wiped from the interior of the tube, but the fog may be wiped therefrom at the moment of its use. It will be observed that my construction does not necessitate any change whatever in the conventional hydrometer parts with the exception that a small hole is punched at the point indicated at 21 for the passage of the rod 19 and consequently may be embodied in conventional hydrometers without any change in the molds employed in their manufacture. It will also be observed that the wiper functions to wipe the tube to a point below the lowermost position of the scale on the float, the stem passing through the wiper during a porion of its movement. It will also be observed that when the rod is withdrawn to the position shown in Fig. 2, no interference to the operation of the float is occasioned by the presence of the wiping mechanism since the stem may pass up into the bulb 5 to a point beyond the lowermost graduation thereon. It will also be noted that the metal sleeve 23 further serves to space the squeegee member 27 so that this member cannot be withdrawn beyond the upper end of the tube so that the wiper can never become displaced.

I have shown and described the present embodiment by way of illustration only, and I do not wish to be limited except as required by the prior art and the scope of the appended claims, in which—

I claim:

1. A hydrometer comprising a transparent tube, flexible means at one end of the tube for insertion in a solution to be drawn into said tube, means for drawing liquid into said tube, a hydrometer float in the tube for testing the liquid and a wiper contacting the inner walls of said tube and adapted to encompass said float during a portion of the wiping operation, and reciprocable means connected to said wiper and projecting through the end of said tube opposite said flexible means for manual actuation of the wiper to wipe foreign matter from the inner surface of the tube.

2. A hydrometer comprising a transparent tube, a bulb spanning one end of the tube to draw liquid therein, flexible means for insertion in a solution to be drawn into said tube, a hydrometer float in said tube, a wiper annularly contacting the walls of said tube, said wiper having space provided for the reception of said float upon reciprocation of the wiper, and manually reciprocable means connected to said wiper and projecting through said bulb for actuation of the wiper to wipe the walls of said tube.

3. The combination in a hydrometer of a transparent tube for holding fluid to be tested, flexible means at one end of said tube for insertion into a solution to be drawn into said tube, a bulb at the opposite end of said tube for drawing liquid into said tube, a hydrometer float in the tube for testing said liquid, a wiper bearing against the inner walls of said tube, and a rod attached to said wiper and extending through said bulb for reciprocating said wiper in the tube to wipe foreign matter from the walls thereof.

4. The combination in a hydrometer of a transparent tube for holding liquid to be tested, flexible means at one end of said tube for insertion into a solution to be drawn into said tube, a bulb at the opposite end of said tube for drawing liquid into said tube, a hydrometer float in the tube for testing said liquid, a rod extending through said bulb, a wiper sleeve carried on the inner end of said rod adapted to be reciprocated in said tube by reciprocation of said rod beyond the end of said bulb, and a squeegee positioned at the lower end of said wiper tube, said squeegee bearing against the inner walls of said tube to wipe the walls of said tube upon reciprocation of said rod.

5. The combination in a hydrometer of a transparent tube for holding fluid to be tested, flexible means at one end of said tube for insertion into a solution to be drawn into said tube, a bulb at the opposite end of said tube for drawing liquid into said tube, a hydrometer float in the tube for testing said liquid, a wiper bearing against the inner walls of said tube, said wiper having a central opening for the passage of the hydrometer float stem for movement of the wiper to a point below the lowermost position of the scale on said stem, and a rod attached to said wiper and extending through said bulb for reciprocating the wiper in the tube.

EVAR JOHNSON.